United States Patent
Taniguchi et al.

(10) Patent No.: US 7,060,735 B2
(45) Date of Patent: Jun. 13, 2006

(54) POLYMER ELECTROLYTE MEMBRANE AND METHOD OF PRODUCTION THEREOF

(75) Inventors: Takumi Taniguchi, Toyota (JP); Mitsuru Nakano, Aichi (JP); Masaya Kawasumi, Aichi (JP); Yu Morimoto, Aichi (JP); Naoki Hasegawa, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 237 days.

(21) Appl. No.: 10/204,481

(22) PCT Filed: Feb. 21, 2001

(86) PCT No.: PCT/IB01/00231

§ 371 (c)(1),
(2), (4) Date: Aug. 21, 2002

(87) PCT Pub. No.: WO01/63683

PCT Pub. Date: Aug. 30, 2001

(65) Prior Publication Data

US 2003/0087972 A1 May 8, 2003

(30) Foreign Application Priority Data

Feb. 23, 2000 (JP) ........................................ 2000-046541

(51) Int. Cl.
*C08J 5/22* (2006.01)
*H01M 8/10* (2006.01)

(52) U.S. Cl. ............................. 521/27; 521/25; 429/30; 429/33; 429/309; 429/310

(58) Field of Classification Search .................. 521/25, 521/27; 429/30, 33, 309, 310
See application file for complete search history.

(56) References Cited

U.S. PATENT DOCUMENTS

| 4,119,581 A | * 10/1978 | Rembaum et al. ............ 521/27 |
| 6,124,060 A | 9/2000 | Akita et al. |
| 6,248,469 B1 | * 6/2001 | Formato et al. ............... 429/41 |

FOREIGN PATENT DOCUMENTS

| JP | A 09 100386 | 4/1997 |
| JP | A 11-503262 | 3/1999 |
| JP | B1 2962360 | 8/1999 |
| JP | 2000-038472 | 2/2000 |
| JP | 2000-080166 | 3/2000 |
| JP | 2000-195528 | 7/2000 |
| JP | 2000-281819 | 10/2000 |
| JP | 2001-514431 | 9/2001 |
| JP | 2002-533890 | 8/2002 |
| JP | 2002-535467 | 10/2002 |
| WO | WO 96/13872 | 5/1996 |
| WO | WO 97/25369 | 7/1997 |
| WO | WO 97/40924 | 11/1997 |
| WO | WO 99/10165 | 3/1999 |
| WO | WO 00/39202 | 7/2000 |
| WO | WO 00/44816 | 8/2000 |

OTHER PUBLICATIONS

Aldebert et al., "New Chemical Synthesis of Mixed Conductivity Polymers", Journal of the Chemical Society, Chemical Communications, Chemical Society, 1986, pp. 1636–1638, XP002157864.

* cited by examiner

*Primary Examiner*—Fred Teskin
(74) *Attorney, Agent, or Firm*—Oliff & Berridge, PLC (57) ABSTRACT

A Polymer Electrolyte Membrane is formed by hot air drying of a membrane formed with an acidic main-polymer having proton conductivity and capability of forming an electrolyte membrane (S12), and then immersing it into a basic polymer solution to impregnate the membrane with the basic polymer (S14). The basic polymer is introduced in a large quantity into a site acting as a proton conduction pass of the main-polymer to take charge of the proton conduction. Since in the Polymer Electrolyte Membrane, a base polymer takes charge of proton conduction as compared with the case where proton takes charge of the proton conduction as a hydrate, the base polymer shows favorable proton conductivity even in a low humidity state at an elevated temperature exceeding boiling point of water.

45 Claims, 4 Drawing Sheets

POLYMER ELECTROLYTE MEMBRANE AND METHOD OF PRODUCTION THEREOF

This application is a 371 of PCT/1801/00231 filed Feb. 20, 2001.

FIELD OF THE INVENTION

The present invention relates to a Polymer Electrolyte Membrane and a method of production thereof, and more particularly, it relates to a Polymer Electrolyte Membrane used as an electrolyte for a Polymer Electrolyte Membrane fuel cell and its production method.

BACKGROUND OF THE INVENTION

As the Polymer Electrolyte Membrane of this sort, a mixture of acidic perfluoro polymer that have acidic groups with basic polyethylene oxide polymer is proposed (for instance, Japanese Patent Application No. 10-249463 etc.). This electrolyte membrane is formed using a mixed solution made by mixing a solution of acidic perfluoro polymer that have acidic groups with a solution of basic polyethylene oxide polymer, and is reported to show favorable proton conductivity in a high-temperature low-humidity state.

As another Polymer Electrolyte Membrane, a substance made by immersing a basic polymer into phosphoric acid is proposed(for instance, Published Japanese Translation of PCT Application, JP-T-11-503262 etc.). This electrolyte membrane is also reported to show favorable proton conductivity in a high-temperature low humidity state.

The existence of water is inevitable when the proton conduction is performed by the migration of ionized proton hydrate, and at the same time, the favorable proton conductivity can not be obtained at a temperature exceeding the boiling point of water. In consideration of these disadvantages, the conduction with the ionized proton is performed in a manner excepting the hydration process. The term "a high-temperature low-humidity state" is used to describe a state in which the temperature exceeds the boiling point of water with the relative humidity is less than 100%.

However, in order to achieve high performance of a fuel cell, further improvement in proton conductivity has been required for the Polymer Electrolyte Membrane which is used as an electrolyte membrane. In addition, the latter Polymer Electrolyte Membrane has a disadvantage that the proton conductivity is lowered with the use of the electrolyte membrane.

DISCLOSURE OF THE INVENTION

An object of the present invention is to improve the proton conductivity of a Polymer Electrolyte Membrane. Another object of the present invention is to obtain a Polymer Electrolyte Membrane having favorable proton conductivity in a high-temperature low humidity state. An object of the method of producing the Polymer Electrolyte Membrane of the present invention is to produce a Polymer Electrolyte Membrane showing favorable proton conductivity in a high-temperature low humidity state.

In order to achieve at least a part of the above-described objects, the Polymer Electrolyte Membrane of the present invention and the method of production thereof adopt the following steps.

A Polymer Electrolyte Membrane in a first aspect of the present invention is a Polymer Electrolyte Membrane used as an electrolyte membrane for a Polymer Electrolyte Membrane fuel cell. This membrane comprises a main-polymer having an acidic or basic site, and sub-polymers capable of forming an acid/base composite structure with a main-polymer, wherein the sub-polymers are introduced more into the main-polymer at the acidic or basic sites of the main-polymer.

In the Polymer Electrolyte Membrane in the first aspect of the present invention, the main-polymer and the sub-polymer form an acid/base composite structure and the sub-polymer takes charge of proton conduction. At this time, since the sub-polymers are introduced more at acidic or basic sites of the main-polymer, the membrane shows more favorable proton conductivity as compared with the one in which sub-polymers are equally introduced. Furthermore, since the sub-polymer takes charge of the proton conduction, more favorable proton conductivity can be obtained even in a high-temperature low humidity state as compared with the case where water is in charge of the proton conduction.

A Polymer Electrolyte Membrane in a second aspect of the present invention is a Polymer Electrolyte Membrane used as an electrolyte membrane for a Polymer Electrolyte Membrane fuel cell, made by impregnating a sub-polymer capable of forming an acid/base composite structure with a main-polymer into the membrane body formed with a main-polymer having acidic or basic sites.

In the Polymer Electrolyte Membrane in the second aspect of the present invention, the main-polymer and the sub-polymer form an acid/base composite structure and the sub-polymer takes charge of proton conduction Since the sub-polymer is introduced into the main-polymer by impregnation, the sub-polymer exists in the clearance of the main-polymer. Since this clearance of the main-polymer is used for the proton conduction, the conduction of proton by the sub-polymer is performed efficiently. In addition, since the sub-polymer takes charge of the proton conduction, more favorable proton conductivity can be obtained even in a high-temperature low humidity state as compared with the case where water is in charge of the proton conduction.

In such a Polymer Electrolyte Membrane in the first or second aspect according to the present invention, the above-described main-polymer may be a polymer having a structure separately comprising a backbone portion for maintaining a membrane configuration, which does not contain an acidic or basic site, and a functional portion having an acidic or basic site. In the Polymer Electrolyte Membrane in the first or second aspect according to the present invention, the main-polymer can be made of a polymer having a sulfonic acid group, a phosphonic acid group, a carboxyl acid group or a boronic acid group.

In the Polymer Electrolyte Membrane in the first or second aspect according to the present invention in which the main-polymer is made of a polymer having a sulfonic acid group, a phosphonic acid group, a carboxyl acid group or a boronic acid group, the main-polymer can be a perfluorosulfonic acid type polymer or can be an ethylene-tetrafluoroethylene-graft-polystyrene sulfonic acid type polymer.

In the Polymer Electrolyte Membrane in the first or second aspect according to the present invention in which the main-polymer is made of a polymer having a sulfonic acid group, a phosphonic acid group, a carboxyl acid group or a boronic acid group, the sub-polymer is preferably a polymer having a glass-transition temperature of 150° C. or less, or having the molecular weight of 100 or more. Since the sub-polymer becomes difficult to isolate from the main-polymer in accordance with the increase in the molecular weight, the proton conductivity in a high-temperature low-humidity state can be maintained for a long time. Furthermore, it is preferable for the sub-polymer to contain any one of the functional groups having structure expressed by the following equations (11) to (15) as a general formula, and it is particularly preferable to contain any one from polyethylene glycol, polypropylene glycol, polyethylene imine and polyphosphoric acid.

[Chem. 3]

$$—O—  \quad (11)$$

$$—S—  \quad (12)$$

$$—\underset{|}{N}—  \quad (13)$$

$$—P—  \quad (14)$$

$$—CO—  \quad (15)$$

In the Polymer Electrolyte Membrane in the first or second aspect of the present invention, the sub-polymer may be the one introduced to the main-polymer by being impregnated into the main-polymer in a state of liquid or solution. In the Polymer Electrolyte Membrane in the first or second aspect of the present invention, the main-polymer and the sub-polymer may be made by crosslink formation or by increasing the molecular weight in conjunction with each other or singly. In this way, isolation of the introduced sub-polymer from the main-polymer can be prevented.

Furthermore, in the Polymer Electrolyte Membrane in the first or second aspect according to the present invention, the sub-polymer preferably contains any one of functional groups having a structure expressed by the following equations (16) to (20) as a general formula.

[Chem. 4]

$$—O—  \quad (16)$$

$$—S—  \quad (17)$$

$$—\underset{|}{N}—  \quad (18)$$

$$—P—  \quad (19)$$

$$—CO—  \quad (20)$$

In the Polymer Electrolyte Membrane in the first or second aspect according to the present invention, any one of polybenzimidazole, polyvinyl imidazole, polyvinyl pyridine, ethylene-tetrafluoroethylene-graft-polyvinyl imidazole, ethylene-tetrafluoroethylene-graft-polyvinylpyridine, polyphosphonate, polyalkylene glycol, and polyalkylenimine can be used as the main-polymer. In the Polymer Electrolyte Membrane in the first or second aspect of the present invention, the sub-polymer may comprise a polymer having a sulfonic acid group, a phosphonic acid group, a carboxyl acid group, or a boronic acid group (—B $(OH)_2$). In particular, a perfluorosulfonic acid type polymer is preferably used as the sub-polymer. It should be noted that the amount of the sub-polymer is from 1 wt % to 90 wt % of the main-polymer and preferably 30 wt % to 60 wt %.

A Polymer Electrolyte Membrane of a third aspect of the present invention is a Polymer Electrolyte Membrane used as an electrolyte membrane for a Polymer Electrolyte Membrane fuel cell, which is comprised of a main-polymer having an acidic site, and a sub-polymer having a relatively basic site with respect to the acidic site of the min-polymer and being capable of forming an acid/base composite structure with the main-polymer, wherein the Polymer Electrolyte Membrane is formed by introducing the sub-polymer into the main-polymer.

In the Polymer Electrolyte Membrane in the third aspect according to the present invention, the main-polymer having an acidic site and the sub-polymer having a relatively basic site with respect to the acidic site of the main-polymer form an acid/base composite structure and the sub-polymer takes charge of the proton conduction. Since the sub-polymer is introduced into the main-polymer, the sub-polymer exists in the clearance of the main-polymer. Since this clearance of the main-polymer is used for the proton conduction, the conduction of proton by the sub-polymer is performed efficiently. In addition, since the sub-polymer takes charge of the proton conduction, more favorable proton conductivity can be obtained in a high-temperature low humidity state as compared with the case where water is in charge of the proton conduction.

A Polymer Electrolyte Membrane of a fourth aspect of the present invention is a Polymer Electrolyte Membrane used as an electrolyte membrane for a Polymer Electrolyte Membrane fuel cell, which is comprised of a main-polymer having a basic site, and a sub polymer having a relatively acidic site in respect to the basic site of the main-polymer and being capable to form an acid/base composite structure with the main-polymer, wherein the Polymer Electrolyte Membrane is formed by introducing the sub-polymer into the main-polymer.

In the Polymer Electrolyte Membrane in the fourth aspect according to the present invention, the main-polymer having a basic site and the sub-polymer having a relatively acidic site with respect to the basic site of the main-polymer form an acid/base composite structure and the sub-polymer takes charge of the proton conduction. Since the sub-polymer is introduced into the main-polymer, the sub-polymer exists in the clearance of the main-polymer. Since this clearance of the main-polymer is used for the proton conduction, the conduction of proton by the main-polymer is performed efficiently. In addition, since the sub-polymer takes charge of the proton conduction, more favorable proton conductivity can be obtained in a high-temperature low humidity state as compared with the case where water is in charge of the proton conduction.

A method of production of a Polymer Electrolyte Membrane of the present invention is a production method of a Polymer Electrolyte Membrane used as the electrolyte membrane for a Polymer Electrolyte Membrane fuel cell. The method comprises the steps of membrane forming to form a membrane body with a main-polymer having an acidic or a basic site, and introducing a sub-polymer capable of forming an acid/base composite structure with the main-polymer into the membrane body of main-polymer thus formed.

According to the production method of the Polymer Electrolyte Membrane of the present invention, a Polymer Electrolyte Membrane showing favorable proton conductivity even in a high-temperature and low humidity state can be produced It should be noted that the Polymer Electrolyte Membrane produced according to this production method forms an acid/base composite structure with the main-polymer and the sub-polymer, and the basic site of main or sub polymer takes charge of the proton conduction.

DETAILED DESCRIPTION OF THE PREFERRED EMBODIMENTS

Figure 1:
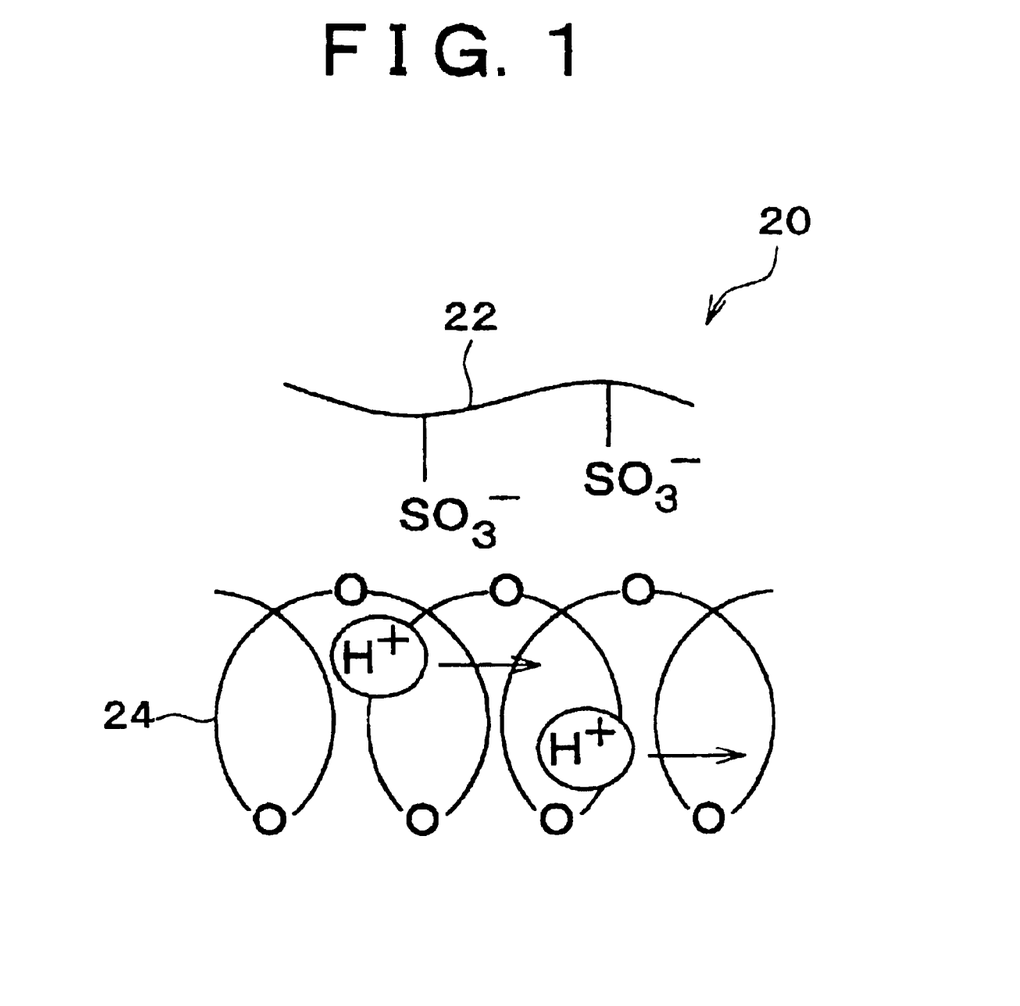
FIG. 1 is a schematic view schematically illustrating a manner of proton conduction performed by a Polymer Electrolyte Membrane of the embodiment according to the present invention.

Embodiments of the present invention will be explained next. FIG. 1 is a schematic view schematically illustrating a manner of the proton conduction performed by a Polymer Electrolyte Membrane 20 of an embodiment of the present invention. The Polymer Electrolyte Membrane 20 of the embodiment is used as an electrolyte membrane for a Polymer Electrolyte Membrane fuel cell, and as shown in the figure, it is comprised of a basic sub-polymer 24 (for instance, polypropylene glycol etc.) having a molecular weight of 100 or more and a glass transition temperature of 150° C. or less, preferably 100° C. or less and a membrane formed with an acidic main-polymer 22 (for instance, a sulfonic acid type polymer etc.) having proton conductivity, wherein the basic sub-polymer 24 is introduced into the acidic main-polymer 22 by impregnation.

In the Polymer Electrolyte Membrane 20 of the embodiment, proton ionized from the main-polymer 22 transfers using the sub-polymer 24 as a conduction pass. Therefore, favorable proton conductivity can be obtained with the Polymer Electrolyte Membrane 20 of the embodiment even at a temperature exceeding the boiling point of water, though the favorable proton conductivity can not be obtained unless its temperature is below the boiling point of water because the existence of water is absolutely necessary in the case when the proton migrates as a hydrate of the proton.

Figure 2:
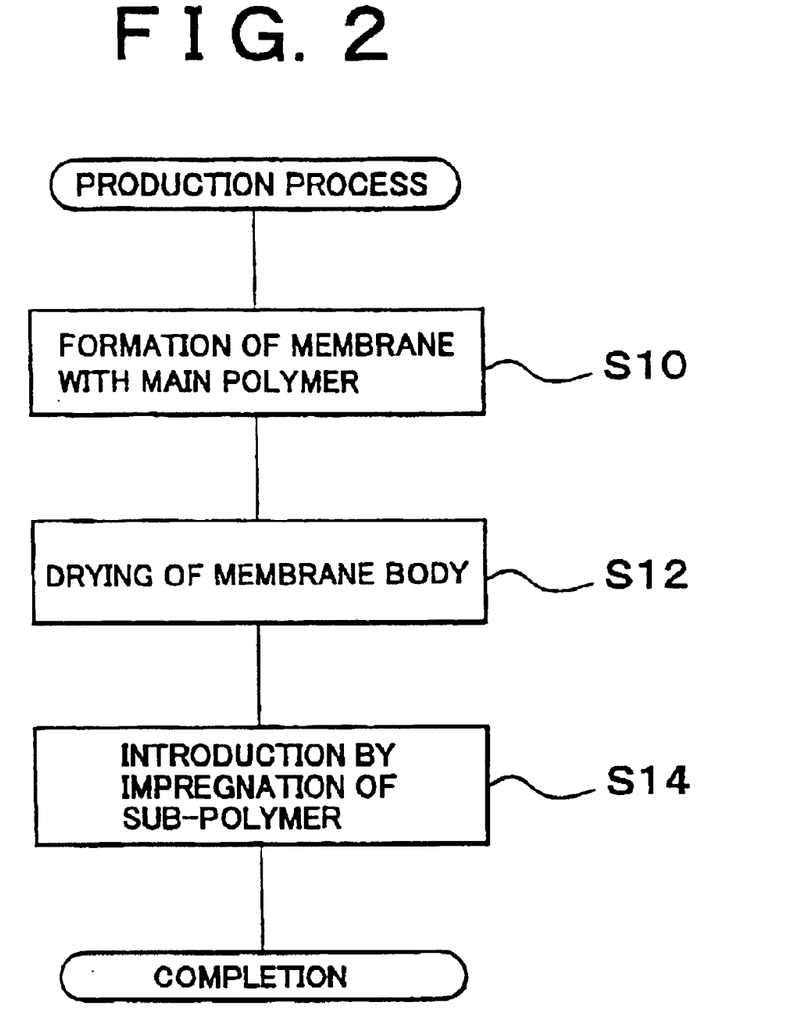
FIG. 2 is a production flow chart showing an example of the production process of the Polymer Electrolyte Membrane of the embodiment.

The process of production of the Polymer Electrolyte Membrane 20 of the embodiment will be explained below. FIG. 2 is a production flow chart showing an example of the production process of the Polymer Electrolyte Membrane 20 of the embodiment As shown in FIG. 2, production of the Polymer Electrolyte Membrane 20 of the embodiment starts at first from a process to form a membrane body with the main-polymer 22 (Step S10). To be more specific, the membrane body is formed by casting solution of the main-polymer 22 on a board material. After that, thus formed membrane body of the main polymer 22 is dried with hot air (Step S12). Next, the dried membrane body is immersed into the liquid sub-polymer 24 to allow the membrane body to be impregnated with the sub-polymer 24 (Step S14), and the Polymer Electrolyte Membrane 20 of the embodiment is completed In the Polymer Electrolyte Membrane 20 of the embodiment thus completed, the sub-polymer 24 is introduced into the clearance of the main-polymer 22. The clearance of the main-polymer 22 is used as a conduction pass for the proton which ionized from the main-polymer 22. By introducing the sub-polymer 24 which takes charge of the proton conduction into the clearance, more preferable proton conductivity can be obtained even in a high-temperature and low humidity state as compared with the case where proton migrates as its hydrate.

With the Polymer Electrolyte Membrane 20 of the above-described embodiment, preferable proton conductivity can be obtained at a temperature exceeding the boiling point of water. Furthermore, since the sub-polymer 24 takes charge of the conduction with the proton, favorable proton conductivity can be obtained even in a low humidity state. Moreover, since the sub-polymer 24 is introduced more into the conduction pass of the proton, proton conductivity in relation to the amount of introduction can be improved as compared with the case where the sub-polymer is introduced equally to the entire main-polymer 22.

Though an acidic main-polymer having proton conductivity is used as the main-polymer 22 in the Polymer Electrolyte Membrane 20 of the embodiment, any substance is acceptable as far as it is a usual acid type polymer material. A substance having a clear structure for proton conduction pass or having high acidity (for instance, perfluorosulfonic acid type polymer etc.) is especially preferable. A substance which is difficult to prepare the solution thereof and thereby difficult to make a solution blend with a basic polymer (for instance, a closslinked polystyrene sulfonic acid membrane, that is a closslinked PSt-S membrane, or ethylene-tetrafluoroethylene-graft-polystyrene sulfonic acid membrane, that is ETFr-g-PSt-S membrane etc.) can be used as the acidic main-polymer. Furthermore, since only the property characterizing the electrolyte is required, a basic polymer having a common basic functional group, for instance, a substance having an ether linkage, an imine linkage such as polyethylene imine, a hydroxyl group which is included in polyethylene glycol, polypropylene glycol, etc. or an amino group, and phosphonate group which is included in polyphosphonate etc. are acceptable as the main-polymer 22.

In the Polymer Electrolyte Membrane 20 of the embodiment, a basic sub-polymer having a molecular weight of 100 or more and a glass transition temperature of 150° C. or less, preferably 100° C. or less is used as the sub-polymer 24, but any substance is acceptable if it is a basic polymer having high molecular movement and being less isolatable from the membrane body. The reason why the molecular weight is defined to be 100 or more is to prevent isolation of the impregnated sub-polymer 24 from the membrane body. In addition, the reason why the glass transition temperature is defined to be 150° C. or less, preferably 100° C. or less, is that the sub-polymer 24 is required to be liquid when the sub-polymer 24 is impregnated into the membrane body. Particularly, polyethylene glycol, polypropylene glycol, and polyethylene imine, etc. are preferable because of their high molecular movement. Polyphosphonate etc. are particularly preferable because such a substance has many basic sites. In addition, when a basic polymer is used for the main-polymer 22 as the membrane body, it is necessary to use an acid polymer, because the sub-polymer 24 is necessary to be different in polarity from the main-polymer 22. In these circumstances, any acid polymer having high molecular movement and being less isolatable from the membrane body is acceptable as an acid polymer.

Figure 3:
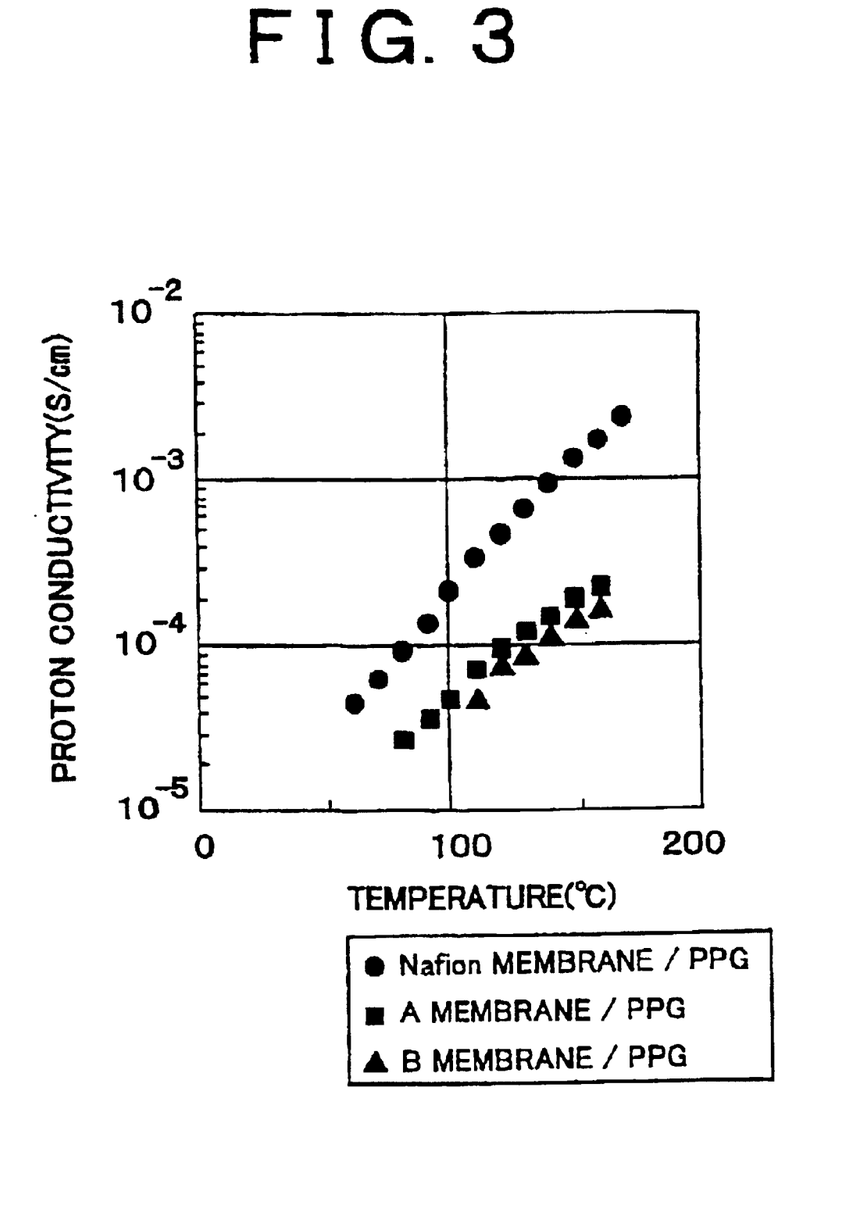
FIG. 3 is a graph illustrating the relationship between temperature and proton conductivity in the anhydrous state when polypropylene glycol is used as the sub-polymer and an already-existing acid type polymer as the main-polymer in the Polymer Electrolyte Membrane in the embodiment.

Next, the qualitative property of the Polymer Electrolyte Membrane 20 of the present invention will be explained. FIG. 3 is a graph illustrating the relationship between temperature and proton conductivity in the anhydrous state when polypropylene glycol (PPG) is used as the sub-polymer (24) and an already-existing acid type polymer as the main-polymer 22 in the Polymer Electrolyte Membrane 20 in the embodiment As the already-existing acid-type polymer, perfluorosulfonic acid type polymer (Nafion membrane made by DuPont) and hydrocarbon series sulfonic acid type polymer (A membrane and B membrane) are used. As is seen from the graph, each membrane shows proton conductivity even in an anhydrous state. The reason why the perfluorosulfonic acid type polymer has more preferable proton conductivity as compared with the hydrocarbon series sulfonic acid type polymer is considered that the perfluorosulfonic acid type polymer is a strong acid.

Figure 4:
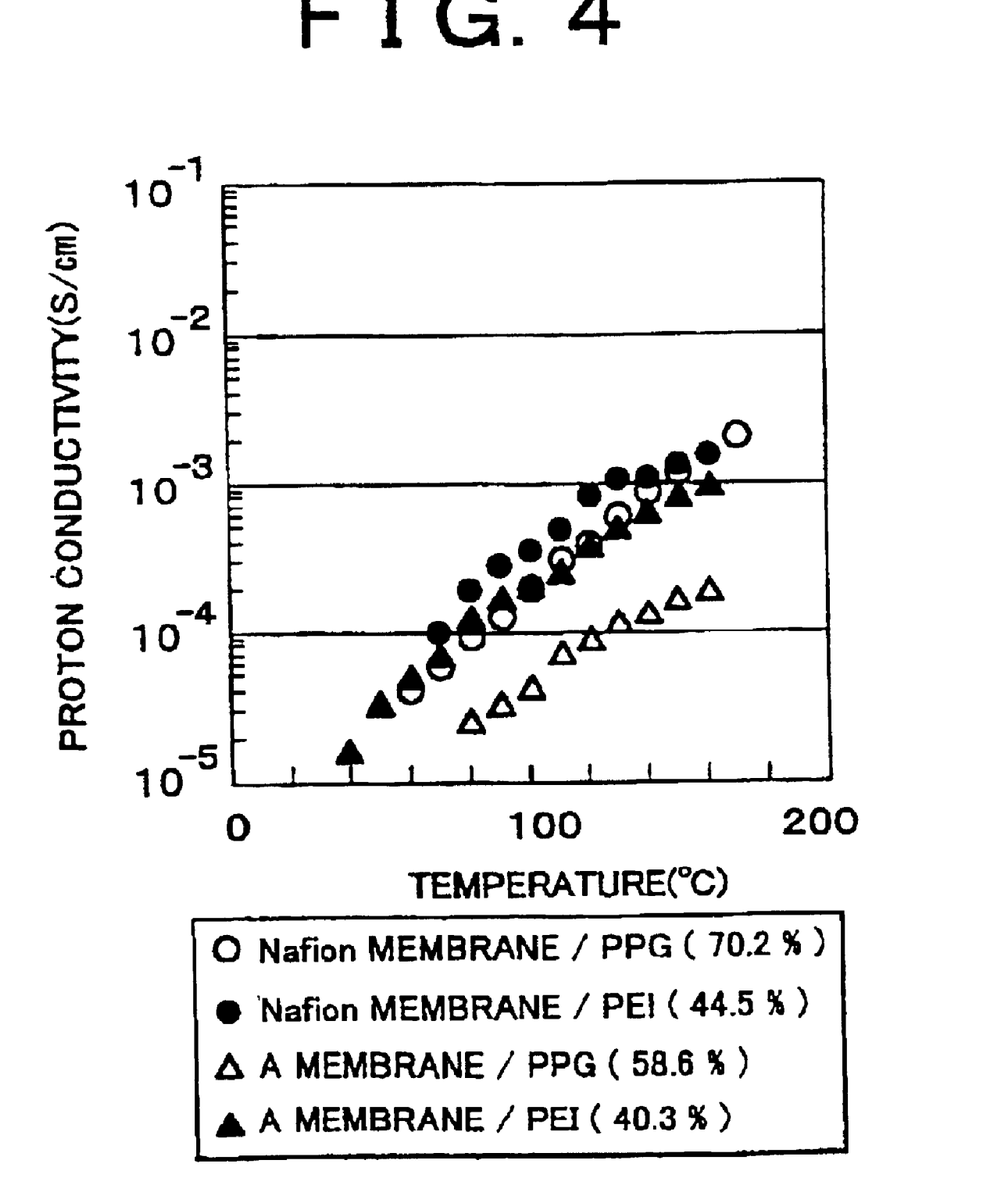
FIG. 4 is a graph illustrating the relationship between temperature and proton conductivity in the anhydrous states when polypropylene glycol is used as the sub-polymer and polyethylene imine as the sub-polymer in the Polymer Electrolyte Membrane in the embodiment.

FIG. 4 is a graph illustrating the relationship between temperature and proton conductivity in the anhydrous states when polypropylene glycol (PPG) and polyethylene imine (PEI) are used as the sub-polymer 24 in the Polymer Electrolyte Membrane 20 of the embodiment. As is seen from the graph, when perfluorosulfonic acid type polymer (Nafion membrane made by DuPont) is used as the main-polymer 22, there is little difference in respect to the above two sub-polymers 24, but when a hydrocarbon series sulfonic acid type polymer (A membrane) is used as the main-polymer 22, more favorable proton conductivity is seen in the case where polyethylene imine (PEI) is used as the sub-polymer than in the case where polypropylene glycol (PPG) is used. It is considered that the reason is because polyethylene imine (PEI) is a more strong basic polymer than polypropylene glycol (PPG).

Prom a result of reviewing the graphs in FIGS. 3 and 4, it is understood that, from the qualitative property of the Polymer Electrolyte Membrane 20 of the embodiment, a strong acidic polymer is preferable to be used for the main-polymer 22, and a strong basic polymer is preferable to be used for the sub-polymer 24 to obtain more preferable proton conductivity in the anhydrous state.

Next, a concrete example of the Polymer Electrolyte Membrane 20 of the embodiment will be explained.

A. Preparation for Each Embodiment (1) A Polymer Electrolyte Membrane Obtained by Impregnating a Basic Polymer into a Strongly Acidic Perfluorosulfonic Acid Type Polymer (Nafion Membrane) which is said to Contain an Ion Cluster.

(1-1) A Polymer Electrolyte Membrane of an Embodiment 1.

The Polymer Electrolyte Membrane of the embodiment 1 is obtained by impregnating a Nafion membrane into polypropylene glycol, that is by immersing the Nafion membrane which is dried with hot air, into polypropylene glycol (PPG) having a molecular weight of 300 for four hours at 100° C.

(1-2) A Polymer Electrolyte Membrane of an Embodiment 2.

The Polymer Electrolyte Membrane of the embodiment 2 is obtained by impregnating a Nafion membrane into polyethylene imine, that is by immersing the Nafion membrane which is dried with hot air into polyethylene imine (PEI) having a molecular weight of 600 for four hours at 100° C.

(1-3) A Polymer Electrolyte Membrane of an Embodiment 3.

The Polymer Electrolyte Membrane of the embodiment 3 is obtained by impregnating a Nafion membrane into polyphosphoric acid, that is by immersing the Nafion membrane which is dried with hot air into polyphosphoric acid for four hours at 100° C.

(2) A Polymer Electrolyte Membrane Obtained by Impregnating a Electrolyte Membrane, which has an Phase Separation Isolated-Phase Structure and can not be made in a Solution State, into a Liquid Base Polymer.

As the electrolyte membrane which has an phase separation structure and can not be made in a solution state, ethylene-tetrafluoroethylene-graft-polystyrene sulfonic acid membrane (ETFE-g-PSt-S membrane) is used. This membrane is obtained by immersing an ethylene-tetrafluoroethylene membrane (ETFE membrane) which is irradiated with a 20 kGy electron beam into a styrene monomer to allow them to react at 60° C. for four hours so that a graft membrane (ETFE-g-PSt membrane) having a graft ratio of 45% is composed, and after processing the composed graft membrane by immersing it into 5% chlorosulfonic acid/dichloroethane solution for one hour at 80° C., the Polymer Electrolyte Membrane can be obtained introducing sulfonic acid groups into styrene portions of the membrane through boiling them with distilled water for one hour.

(2-1) A Polymer Electrolyte Membrane of an Embodiment 4.

The Polymer Electrolyte Membrane of the embodiment 4 is obtained by impregnating an ETEg-PSt-S membrane into polypropylene glycol, that is by immersing an ETFE-g-PSt-S membrane which is dried with hot air into polypropylene glycol (PPG) having a molecular weight of 300 for four hours at 100° C.

(2-2) A Polymer Electrolyte Membrane of an Embodiment 5.

The Polymer Electrolyte Membrane of the embodiment 5 is obtained by impregnating an ETFE-g-PSt-S membrane into polyethylene imine, that is by immersing an ETFE-g-PSt-S membrane which is dried with hot air into polyethylene imine (PEI) having a molecular weight of 600 for four hours at 100° C.

(3) A Polymer Electrolyte Membrane by Closslinking an Impregnated Basic Polymer to make its Molecular Weight High.

(3-1) A Polymer Electrolyte Membrane of an Embodiment 6.

The Polymer Electrolyte Membrane of the embodiment 6 is obtained by adding glycerin triglycidyl ether to the Polymer Electrolyte Membrane (Nafion/PEI) of the embodiment 2, by letting them at ambient temperature for one hour to allow the glycerin triglycidyl ether to diffuse into the membrane, and by heat-treating it for four hours at 100° C. to anchor a polyethylene imine (PEI) disperse phase into the membrane.

(4) A Polymer Electrolyte Membrane as a Comparison.

As the Polymer Electrolyte Membrane of the comparison is adopted from the one formed with a solution obtained by dissolving a main-polymer and a sub-polymer into a solvent.

(4-1) A Polymer Electrolyte Membrane of a Comparison 1.

The Polymer Electrolyte Membrane of the comparison 1 is obtained by dissolving a mixture of a Nafion membrane and polyethylene glycol (PEG) having a molecular weight of 600 at a ratio of 3:2 in dimethylformamide, by casting the solution thus obtained on a glass board and by vacuum drying it for 24 hours at 70° C.

(4-2) A Polymer Electrolyte Membrane of a Comparison 2.

The Polymer Electrolyte Membrane of the comparison 2 is obtained by dissolving a mixture of a Nafion membrane and polypropylene glycol (PPG) having a molecular weight of 300 at a ratio of 3:2 in dimethylformamide, by casting the solution thus obtained on a glass board and by vacuum drying it for 24 hours at 70° C.

B. Method of Evaluation and the Result of the Evaluation.

Each Polymer Electrolyte Membrane of the embodiments 1 to 6 and comparisons 1 and 2 is secured to a jig (the distance between electrodes is 10 mm) for measuring proton conductivity, and the electrical resistance is measured using an AC one pair terminal method (10 kHz) in a separable flask in a nitrogen atmosphere. The result of this measurement is proton conductivity of each Polymer Electrolyte Membrane. The graphs in FIGS. 3 and 4 are obtained by measuring the electrical resistance while changing the temperature under the same condition.

The amount of introduction of the sub-polymer is defined as the deviation of the weight after and before the introduction. The results are shown in the next table.

TABLE 1

| SAMPLE | COMPOSITION | METHOD OF INTRODUCTION | AMOUNT OF INTRODUCTION (%) | PROTON CONDUCTIVITY @ 150° C. (S/cm) |
|---|---|---|---|---|
| EMBODIMENT 1 | Nafion/PPG | DOPING | 70 | $1.5 \times 10^{-3}$ |
| EMBODIMENT 2 | Nafion/PEI | DOPING | 45 | $1.7 \times 10^{-3}$ |
| EMBODIMENT 3 | Nafion/Polyphosphoric acid | DOPING | 40 | $5.7 \times 10^{-3}$ |
| EMBODIMENT 4 | ETFE-g-PSt-S/PPG | DOPING | 59 | $3.0 \times 10^{-4}$ |
| EMBODIMENT 5 | ETFE-g-PSt-S/PEI | DOPING | 50 | $9.6 \times 10^{-4}$ |
| EMBODIMENT 6 | Nafion/Bridge Formation PEI | DOPING | 45 | $1.4 \times 10^{-3}$ |
| COMPARISON 1 | Nafion/PEG | SOLUTION BLEND | 66 | $3.0 \times 10^{-5}$ |
| COMPARISON 2 | Nafion/PPG | SOLUTION BLEND | 66 | $5.0 \times 10^{-6}$ |

As is seen in the table, the Polymer Electrolyte Membranes of the respective embodiments 1 to 6 show a favorable proton conductivity about 10 to 100 times as much as those in the comparisons 1 and 2 at 150° C. in an anhydrous state. As is seen in the experimental result of the Polymer Electrolyte Membranes of the embodiment 6, even when the introduced sub-polymer 24 is secured into the main-polymer 22 by a closslinking reaction, the same proton conductivity is shown as those in the case without closslinking. The introduced sub-polymer 24 is secured into the main-polymer 22 by closslinking as described above, and thereby the detachment of the sub-polymer 24 from the main-polymer 22 can be prevented, the rigidity of the membrane is increased, and the application at a more elevated temperature is enabled.

The Polymer Electrolyte Membrane 20 of the embodiment explained above in detail is described on the assumption that it is used as an electrolyte membrane for a Polymer Electrolyte Membrane fuel cell, but it is applicable to any device performing the proton conductivity using an electrolyte membrane.

As above, the embodiments according to the present invention have been explained, but the present invention is not limited at all to these embodiments, and it is needless to say that the present invention is applicable in a variety of embodiments so far as it is within the gist of the invention. Incidentally, the term "impregnation" in this application includes doping.

What is claimed is:

1. A polymer electrolyte membrane used as an electrolyte membrane of a polymer electrolyte membrane fuel cell, said electrolyte membrane comprising:
    a main-polymer having acidic sites or basic sites; and
    a sub-polymer capable of forming acid/base composite structure together with said main-polymer;
    wherein the sub-polymer is introduced into the clearance of the main-polymer, the clearance of the main-polymer being used as a conduction pass for protons ionized from the main-polymer, and
    wherein said sub-polymer is introduced more into the acidic or basic sites of said main-polymer, and the acidic or basic sites of said main-polymer chemically interact with basic or acidic sites of said sub-polymer during proton conduction.

2. The polymer electrolyte membrane according to claim 1 wherein said main-polymer is a polymer having a structure divided into a backbone portion not containing an acidic or basic site for maintaining the membrane configuration and a portion containing an acidic or basic site.

3. The polymer electrolyte membrane according to claim 2, wherein said main-polymer is formed with a polymer having a sulfonic acid group, a phosphorous acid group, a carboxylic acid or a boronic acid group.

4. The polymer electrolyte membrane according to claim 3, wherein said main-polymer is a perfluorosulfonic acid polymer.

5. The polymer electrolyte membrane according to claim 3, wherein said main-polymer is an ethylene-tetrafluoroethylene-graft-polystyrene sulfonic acid polymer.

6. The polymer electrolyte membrane according to claim 1, wherein said sub-polymer is introduced by being impregnated in a liquid or solution state into said main-polymer.

7. The polymer electrolyte membrane according to claim 3, wherein said sub-polymer is a polymer having a glass transition temperature of 150° C. or less.

8. The polymer electrolyte membrane according to claim 3, wherein said sub-polymer is a polymer having a molecular weight of 100 or more.

9. The polymer electrolyte membrane according to claim 3, wherein said sub-polymer includes any one of functional groups having a structure expressed with the following equations (1) to (5) as a general formula $$—O—  \quad (1)$$

$$—S—  \quad (2)$$

$$—N—  \quad (3)$$

$$—P—  \quad (4)$$

$$—CO—  \quad (5).$$

10. The polymer electrolyte membrane according to claim 3, wherein said sub-polymer is any one of polyethylene glycol, polypropylene glycol, polyethylene imine or polyphosphoric acid.

11. The polymer electrolyte membrane according to claim 1, wherein said sub-polymer includes any one of functional groups having a structure expressed with the following equations (6) to (10) as a general formula $$—O—  \quad (6)$$

$$—S—  \quad (7)$$

—N— (8)
|
—P— (9)

—CO—. (10)

12. The polymer electrolyte membrane according to claim 11, wherein said sub-polymer includes a polymer having a sulfonic acid group, a phosphorous acid group, carboxylic acid group or boronic acid group (—B (OH)$_2$).

13. The polymer electrolyte membrane according to claim 11, wherein said sub-polymer includes a perfluorosulfonic acid polymer.

14. The polymer electrolyte membrane according to claim 1, wherein said main-polymer is any one of polybenzimidazole, polyvinyl imidazole, polyvinyl pyridine, ethylene-tetrafluoroethylene-graft-polyvinylimidazole, ethylene-tetrafluoroethylene-graft-polyvinylpyridine, polyphosphonate, polyalkylene glycol, and polyalkylenimine.

15. The polymer electrolyte membrane according to claim 14, wherein said sub-polymer includes a polymer having a sulfonic acid group, a phosphorous acid group, carboxylic acid group or boronic acid group (—B (OH)$_2$).

16. The polymer electrolyte membrane according to claim 14, wherein said sub-polymer includes a perfluorosulfonic acid polymer.

17. A polymer electrolyte membrane used as an electrolyte membrane for a polymer electrolyte membrane fuel cell, said electrolyte membrane comprising:
a membrane body formed with a main-polymer having acidic sites or basic sites; and
a sub-polymer capable of forming an acid/base composite structure with said main-polymer;
wherein said membrane is formed by impregnating the sub-polymer into said main-polymer; and
wherein the sub-polymer is introduced into the clearance of the main-polymer, the clearance of the main-polymer being used as a conduction pass for protons ionized from the main-polymer and the acidic or basic sites of said main-polymer chemically interact with basic or acidic sites of said sub-polymer during, proton conduction.

18. The polymer electrolyte membrane according to claim 17, wherein said main-polymer is a polymer having a structure divided into a backbone portion not containing an acidic or basic site for maintaining the membrane configuration and a portion containing an acidic or basic site.

19. The polymer electrolyte membrane according to claim 18, wherein said main-polymer is formed with a polymer having a sulfonic acid group, a phosphorous acid group, a carboxylic acid or a boronic acid group.

20. The polymer electrolyte membrane according to claim 19, wherein said main-polymer is a perfluorosulfonic acid polymer.

21. The polymer electrolyte membrane according to claim 19, wherein said main-polymer is an ethylene-tetrafluoroethylene-graft-polystyrene sulfonic acid polymer.

22. The polymer electrolyte membrane according to claim 17, wherein said sub-polymer is introduced by being impregnated in a liquid or solution state into said main-polymer.

23. The polymer electrolyte membrane according to claim 19, wherein said sub-polymer is a polymer having a glass transition temperature of 150° C. or less.

24. The polymer electrolyte membrane according to claim 19, wherein said sub-polymer is a polymer having a molecular weight of 100 or more.

25. The polymer electrolyte membrane according to claim 19, wherein said sub-polymer includes any one of functional groups having a structure expressed with the following equations (1) to (5) as a general formula

—O— (1)

—S— (2)

—N— (3)
|

—P— (4)

—CO— (5).

26. The polymer electrolyte membrane according to claim 19, wherein said sub-polymer is any one of polyethylene glycol, polypropylene glycol, polyethylene imine or polyphosphoric acid.

27. The polymer electrolyte membrane according to claim 17, wherein said sub-polymer includes any one of functional groups having a structure expressed with the following equations (6) to (10) as a general formula

—O— (6)

—S— (7)

—N— (8)
|

—P— (9)

—CO— (10).

28. The polymer electrolyte membrane according to claim 17, wherein said main-polymer is any one of polybenzimidazole, polyvinyl imidazole, polyvinyl pyridine, ethylene-tetrafluoroethylene-graft-polyvinylimidazole, ethylene-tetrafluoroethylene-graft-polyvinylpyridine, polyphosphonate, polyalkylene glycol, and polyalkylenimine.

29. The polymer electrolyte membrane according to claim 27, wherein said sub-polymer includes a polymer having a sulfonic acid group, a phosphorous acid group, carboxylic acid group or boronic acid group (—B (OH)$_2$).

30. The polymer electrolyte membrane according to claim 27, wherein said sub-polymer includes a perfluorosulfonic acid polymer.

31. The polymer electrolyte membrane according to claim 28, wherein said sub-polymer includes a polymer having a sulfonic acid group, a phosphorous acid group, carboxylic acid group or boronic acid group (—B (OH)$_2$).

32. The polymer electrolyte membrane according to claim 28, wherein said sub-polymer includes a perfluorosulfonic acid polymer.

33. A method of producing a polymer electrolyte membrane used as an electrolyte membrane for a polymer electrolyte membrane fuel cell, comprising the steps of:
forming a membrane body with a main-polymer having an acidic or a basic site; and
introducing a sub-polymer capable of forming an acid/base composite structure with the main-polymer into the membrane body, wherein the sub-polymer is introduced into the clearance of the main-polymer, the clearance of the main-polymer being used as a conduction pass for protons ionized from the main-polymer, such that the acidic or basic site of said main-polymer chemically interacts with a basic or acidic site of said sub-polymer during proton conduction.

34. A polymer electrolyte membrane used as an electrolyte membrane for a polymer electrolyte membrane fuel cell, comprising:
a main-polymer having an acidic site; and
a sub-polymer having a relatively basic site with respect to the acidic site of said main-polymer and being capable of forming an acid/base composite structure with said main-polymer;
wherein the polymer electrolyte membrane is made by introducing said sub-polymer into the clearance of said main-polymer, the clearance of the main-polymer being used as a conduction pass for protons ionized from the main-polymer; and
wherein the acidic site of said main-polymer chemically interacts with the basic site of said sub-polymer during proton conduction.

35. A polymer electrolyte membrane used as an electrolyte membrane for a polymer electrolyte membrane fuel cell, comprising:
a main-polymer having a basic site; and
a sub-polymer having a relatively acidic site with respect to the basic site of said main-polymer and being capable of forming an acid/base composite structure with said main-polymer;
wherein the polymer electrolyte membrane is made by introducing said sub-polymer into the clearance of said main-polymer, the clearance of the main-polymer being used as a conduction pass for protons ionized from the main-polymer; and
wherein the basic site of said main-polymer chemically interacts with the acidic site of said sub-polymer during proton conduction.

36. The polymer electrolyte membrane according to claim 1, wherein said sub-polymer takes charge of proton conduction.

37. The polymer electrolyte membrane according to claim 17, wherein said sub-polymer is introduced more into the acidic or basic sites of said main-polymer.

38. The polymer electrolyte membrane according to claim 37, wherein said sub-polymer takes charge of proton conduction.

39. The method according to claim 33, wherein said sub-polymer takes charge of the proton conduction.

40. The polymer electrolyte membrane according to claim 34, wherein said sub-polymer takes charge of proton conduction.

41. The polymer electrolyte membrane according to claim 35, wherein said sub-polymer takes charge of proton conduction.

42. A fuel cell comprising a polymer electrolyte membrane according to claim 1.

43. A fuel cell comprising a polymer electrolyte membrane according to claim 17.

44. A fuel cell comprising a polymer electrolyte membrane according to claim 34.

45. A fuel cell comprising a polymer electrolyte membrane according to claim 35.

* * * * *